W. N. DENNISON.
GOVERNOR FOR MOTORS.
APPLICATION FILED APR. 9, 1910.

1,060,827.

Patented May 6, 1913.

2 SHEETS—SHEET 1.

WITNESSES
Clifton C. Hallowell
F. J. Hartman

INVENTOR
Wilburn N. Dennison,
BY
ATTORNEY

W. N. DENNISON.
GOVERNOR FOR MOTORS.
APPLICATION FILED APR. 9, 1910.
1,060,827.
Patented May 6, 1913.
2 SHEETS—SHEET 2.
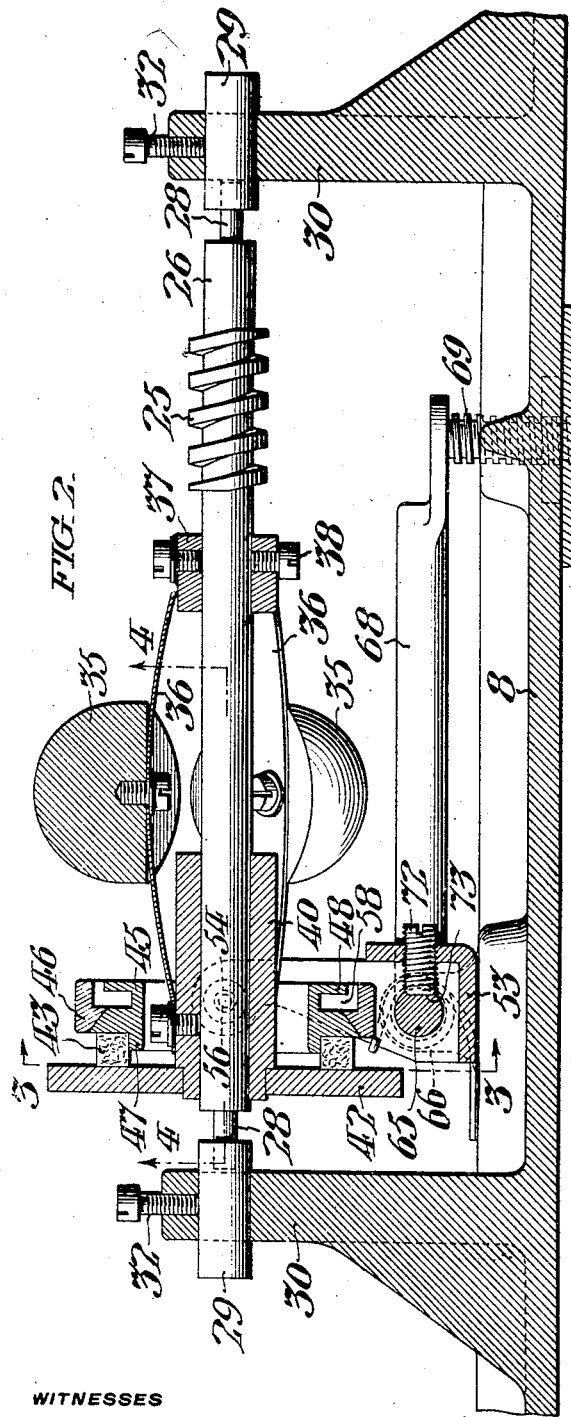
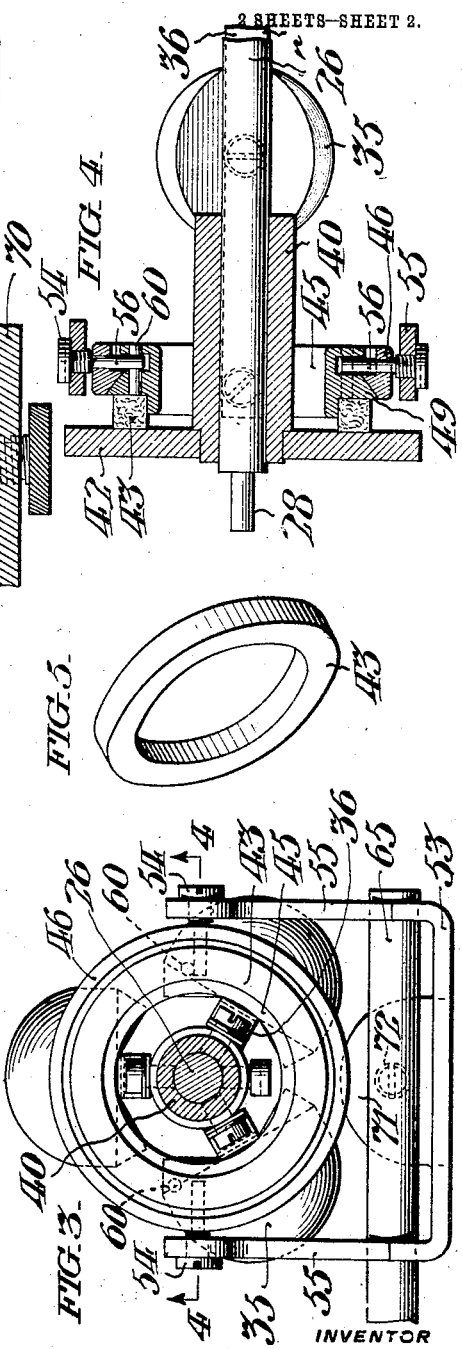
INVENTOR
Wilburn N. Dennison,
WITNESSES
BY
ATTORNEY

UNITED STATES PATENT OFFICE.

WILBURN N. DENNISON, OF MERCHANTVILLE, NEW JERSEY, ASSIGNOR TO VICTOR TALKING MACHINE COMPANY, A CORPORATION OF NEW JERSEY.

GOVERNOR FOR MOTORS.

1,060,827. Specification of Letters Patent. Patented May 6, 1913.

Application filed April 9, 1910. Serial No. 554,453.

*To all whom it may concern:*

Be it known that I, WILBURN N. DENNISON, a citizen of the United States, and a resident of the borough of Merchantville, in the county of Camden and State of New Jersey, have invented certain new and useful Improvements in Governors for Motors, of which the following is a specification, reference being had to the accompanying drawings.

This invention relates to mechanism for governing the speed of spring motors, and particularly to that class of governing mechanism which is adapted for sound reproducing machines.

The principal object of this invention is to provide simple and efficient mechanism that will insure a uniform speed, irrespective of possible irregularities in the coöperative parts.

The form of this invention hereinafter described provides a governor having a rotary friction disk whose axial position tends to vary in accordance with the speed of rotation of suitable governor balls; a friction pad arranged to engage said friction disk; a holder for said friction pad comprising relatively movable members forming a universal joint whereby the axis of said friction pad is capable of gyration; and means arranged to shift said holder toward and away from said friction disk.

This invention also comprises the various novel features of construction and arrangement hereinafter more definitely specified.

Figure 1:
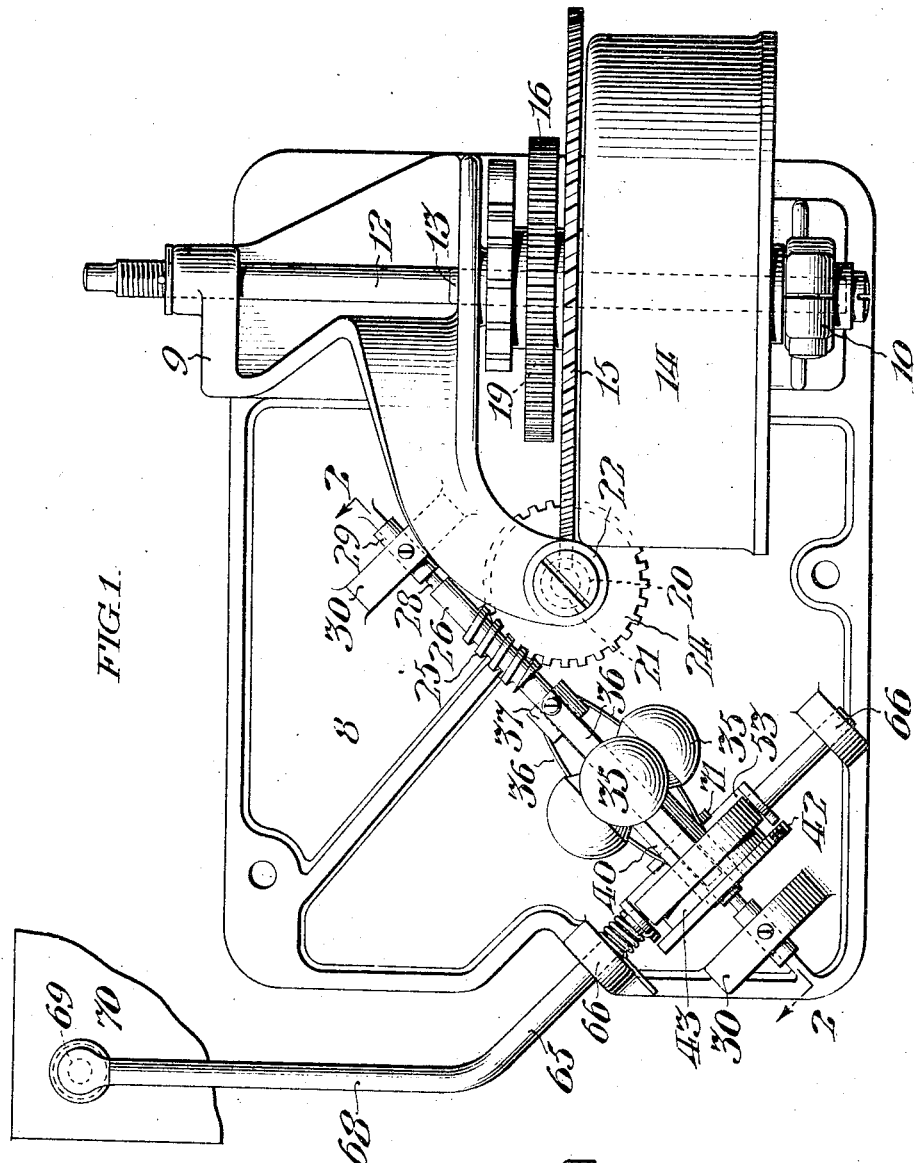
Figure 6:

In the accompanying drawings, Figure 1 is an inverted plan view of the motor mechanism comprising a governor embodying a convenient form of this invention; Fig. 2 is an enlarged vertical longitudinal sectional view of the governor mechanism taken on the line 2—2 in Fig. 1; Fig. 3 is an enlarged transverse vertical sectional view of the motor mechanism taken on the line 3—3 in Fig. 2; Fig. 4 is an enlarged fragmentary plan sectional view taken on the lines 4—4 in Figs. 2 and 3; Fig. 5 is an enlarged perspective view of the friction pad; and Fig. 6 is a greatly enlarged fragmentary view showing a sectional profile of the adjacent faces of the friction pad holder members, which form the universal joint.

In said figures, the motor frame 8 comprises the hangers 9 and 10, which provide bearings for the winding shaft 12 and the spring motor shaft 13. The motor shaft 13 carries the spring box 14, worm gear 15, and gear 16, arranged to mesh with the pinion 19 on the winding shaft 12. The worm gear 15 is in mesh with the worm 20, on the shaft 21, which is suitably journaled in the bearing 22, on the hanger 9, and provided with the worm gear 24. The worm gear 24 is in mesh with the worm 25, on the governor shaft 26, whose opposite reduced ends form trunnions 28, which are suitably journaled in adjustable bearings 29, removably mounted in the bearing lugs 30, depending from the frame plate 8, said bearings being suitably secured in adjusted position by the screws 32.

The governor comprises the centrifugal governor balls 35, carried by the spring arms 36, preferably formed of flat steel strips, which are conveniently attached, at one end, to the hub 37, secured to the shaft 26 in any desired position by the set screw 38, to rotate therewith, and to the other end with the sleeve 40, which is movable axially with respect to the shaft 26, but arranged to rotate therewith, and carries the friction disk 42.

The friction pad 43 is conveniently formed of an annular piece of leather or other convenient material which is arranged to be carried by the holder, comprising the relatively movable ball and socket members 45 and 46, in such position as to be conveniently engaged with the friction disk 42 with any desired degree of pressure, as hereinafter described. The holder member 45 comprises the flange 47, upon which the friction pad 43 is supported, and the outwardly turned flange 48. Said holder member 45 also comprises the centrally disposed outwardly extending flange 49, having a curved face 50 forming the zone of a sphere, as best shown in Fig. 6, and arranged to engage the inner conical face 51 of the holder member 46.

The friction pad holder is conveniently supported by the yoke frame 53, which is provided with bearing screws 54 in threaded engagement with the arms 55 of said frame 53. The reduced shanks 56 of said screws conveniently form trunnions extending through the annular wall of the holder member 46 in rotatable relation therewith, and project into the groove 58, formed by the flanges 48 and 49 in the holder member 45. Stop pins 60, are disposed across said groove 58 in such relation as to permit a slight rotary movement of the holder member 45, with respect to the holder member 46. Said rotary movement being limited by the engagement of said pins 60 with said trunnions 56, as shown in Figs. 3 and 4, so that, as may be readily seen, while the member 45 and its friction pad 43 are prevented from complete rotation with the disk 42, said member 45 is free to move with respect to the member 46, by the relative slipping of their respective contiguous surfaces, in such a relation that the axis of the member 45 may gyrate; that is to say, said axis may move in the path of the surface of a cone, thus accommodating the plane of the face of the friction pad 43 to a possible wabbling motion of the disk 42, in event of its being slightly out of true.

The central aperture of the annular friction pad holder is sufficiently large to surround the sleeve 40, so that it may be conveniently shifted toward and from the friction disk 42 without contacting with any of the rotating parts of the governor.

The yoke frame 53 is conveniently mounted on the shaft 65, which is journaled in the bearings 66, and has its free end bent to form the lever 68, which is arranged to be shifted by the set screw 69, in threaded engagement with the base frame 70, and adjustable to regulate the speed of the motor. Said yoke frame 53 is provided with the upturned lug 71, having the set screw 72 in threaded engagement therewith, arranged to engage a suitable socket 73, in the shaft 65, whereby any movement of the lever 68 effects a movement of the friction pad 43, relative to the friction disk 42, depending upon the direction of movement of said lever.

In the operation of the motor, the governor spindle is driven through the gears and worms above described, and as the speed of said shaft increases, the governor balls 35 are centrifugally extended, and the friction disk 42 consequently shifted toward the friction pad 43, which is set to such a position as to determine the speed desired, so that when said disk 42 engages the friction pad 43 with a suitable pressure, the speed of the shaft 26 is diminished in accordance with the frictional engagement of the contiguous surfaces, whereby the speed of said shaft 26 is maintained uniform. Any desired uniform speed may be readily maintained, or the motor completely stopped, by adjusting the thumb screw 69, which, through the lever 68, sets the friction pad 43 at the position desired; for instance, by rotating the screw to shift it toward the lever 68, with respect to Fig. 2, the friction pad 43 is shifted, to reduce the speed of the motor, and the reverse movement of said thumb screw 69, effects an increased speed of said motor.

It is not desired to limit this invention to the precise details of construction and arrangement herein set forth, as it is obvious that various modifications may be made therein without departing from the essential features of this invention as defined in the appended claims.

Having thus described my invention, I claim:

1. In a governor, the combination with a rotatable member, of a friction pad arranged to engage said member, to control the speed thereof, and having a universal jointed support, comprising relatively rotatable ball and socket members, one of which comprises an internal conical surface and the other having a pair of flanges and an interposed groove, one of said flanges comprising a spherical zone arranged to engage said conical surface, and capable of shifting in variable angular positions relative to said conical surface, members connecting said flanges and means extending from the first-named of said ball and socket members into an annular path of said last-named member, to limit the relative rotary movement of said ball and socket members.

2. In a governor, the combination with a rotatable member, of a friction pad arranged to engage said member, to control the speed thereof, and having a universal jointed support, comprising relatively rotatable ball and socket members, one of which comprises an internal conical surface and the other having a pair of flanges and an interposed groove, one of said flanges comprising a spherical zone arranged to engage said conical surface, and capable of shifting in variable angular positions relative to said conical surface, members connecting said flanges and means extending from the first-named of said ball and socket members into an annular path of said last-named member, to limit the relative rotary movement of said ball and socket members, said rotary movement being distinct from and independent of the gyration of said universal joint.

3. In a governor, the combination with a rotatable member, of a friction pad arranged to engage said member, to control the speed thereof, and having a universal jointed support, comprising relatively rotatable ball and socket members, one of which comprises an internal conical surface and the other having a pair of flanges and an interposed groove, one of said flanges comprising a spherical zone arranged to engage said conical surface, and capable of shifting in variable angular positions relative to said conical surface, pins bridging said groove and pins projecting inwardly from the first-named of said ball and socket members, adjacent to and in the annular path of said first-named pins to limit the relative rotary movement of said ball and socket members.

4. In a governor, the combination with a rotatable member, of a friction pad arranged to engage said member, to control the speed thereof, and having a universal jointed support, comprising relatively rotatable ball and socket members, one of which comprises an internal conical surface and the other having a pair of flanges and an interposed groove, one of said flanges comprising a spherical zone arranged to engage said conical surface, and capable of shifting in variable angular positions relative to said conical surface, pins bridging said groove and pins projecting inwardly from the first-named of said ball and socket members, adjacent to and in the annular path of said first-named pins to limit the relative rotary movement of said ball and socket members, said rotary movement being distinct from and independent of the gyration of said universal joint.

In witness whereof I have hereunto set my hand this 7th day of April, A. D. 1910.

WILBURN N. DENNISON.

Witnesses:
 FRANK B. MIDDLETON, Jr.,
 HARRY COBB KENNEDY.